United States Patent
Ichioka (10) Patent No.: US 7,584,483 B2
(45) Date of Patent: Sep. 1, 2009

(54) CONTENT-EXHIBITION CONTROL APPARATUS AND METHOD

(75) Inventor: Hidetoshi Ichioka, Tokyo (JP)

(73) Assignee: Sony Corporation, Tokyo (JP)

( * ) Notice: Subject to any disclaimer, the term of this patent is extended or adjusted under 35 U.S.C. 154(b) by 1094 days.

(21) Appl. No.: 09/916,002

(22) Filed: Jul. 26, 2001

(65) Prior Publication Data
US 2002/0059649 A1    May 16, 2002

(30) Foreign Application Priority Data
Jul. 28, 2000    (JP)    ............... P2000-229219

(51) Int. Cl.
H04H 60/33    (2008.01)
H04N 7/16    (2006.01)
(52) U.S. Cl. .............. 725/9; 725/135; 725/142
(58) Field of Classification Search ............ 725/14, 725/9, 22
See application file for complete search history.

(56) References Cited

U.S. PATENT DOCUMENTS 6,088,722 A * 7/2000 Herz et al. ............... 709/217
6,481,011 B1 * 11/2002 Lemmons ................. 725/47
6,601,237 B1 * 7/2003 Ten Kate et al. .......... 725/47
6,782,551 B1 * 8/2004 Entwistle .................. 725/46
6,983,478 B1 * 1/2006 Grauch et al. ............. 725/13
7,167,895 B1 * 1/2007 Connelly .................. 709/203
2001/0043795 A1 * 11/2001 Wood et al. ............... 386/69
2005/0196135 A1 * 9/2005 Horiguchi ................. 386/46

* cited by examiner

Primary Examiner—Christopher Kelley
Assistant Examiner—Justin E Shepard
(74) Attorney, Agent, or Firm—Frommer Lawrence & Haug LLP; William S. Frommer; Thomas F. Presson (57) ABSTRACT

A hard-disk recorder receives a broadcasting content distributed from a satellite broadcasting service system and records it. The satellite broadcasting service system generates degree-of-exposure control data for the broadcasting content, and sends it to the hard-disk recorder through a server system. The hard-disk recorder receives the degree-of-exposure control data, and controls the degree of exposure of the recorded content according to degree-of-exposure designation included in the received degree-of-exposure control data.

3 Claims, 11 Drawing Sheets

```
ExposureControl sample=
    {1837764643,
        {
            {NUMBER OF REPRODUCTIONS, 5},
            {EFFECTIVE TIME, 72},
            {CHARACTER SIZE, 12},
            {NONE, 0},
        }
    };
```

CONTENT-EXHIBITION CONTROL APPARATUS AND METHOD

BACKGROUND OF THE INVENTION

1. Field of the Invention

The present invention relates to content-exhibition control apparatuses and methods, and more particularly, to a content-exhibition control apparatus and method which control the degree of exposure of a program to increase the audience rating of the program and the effect of an advertisement in the program.

2. Description of the Related Art

Broadcasting business parties which provide (distribute) TV broadcasting without charge (do not collect audience fees from users but) obtain advertisement income from advertisers to operate their businesses. Advertisers believe that TV broadcasting is the largest advertisement medium and expect a large effect of advertisements for an unspecified number of audiences.

Since there must be an upper limit of the total time during which the audience views TV broadcasting in a day, and the audience cannot view many contents at a time, however, a broadcasting business party needs to obtain a sufficient degree of exposure (so called audience rating) by a difference from other broadcasting business parties to increase the effect of advertisements.

Broadcasting business parties and advertisers control the degrees of exposure of contents (such as programs), for example, by having a popular actor or actress appear with a high production expenditure or by putting an advertisement of the forthcoming advertisement, including those on other media, to obtain much talk in advance. Alternatively, they broadcast the program at a time slot where it is expected by statistics that many audiences view, such as a so-called prime time in a program arrangement.

Therefore, advertisers and advertising agencies have to rely on limited methods, such as purchasing an advertisement right in a time slot called the prime time or putting an advertisement in many time slots.

These methods, however, require a huge amount of money.

If it is possible that a content-exhibition method is changed for each audience, the value of an advertisement increases. Since broadcasting belongs to simultaneous-transmission-to-all-audience media, however, a content exhibition method cannot be diversified due to its nature.

With the use of bi-directional service, such as video on demand (VOD), a content-exhibition method can be individually changed. But constructing a distribution infrastructure requires a large expenditure. In addition, it is difficult to provide an unspecified number of audience with uniform quality.

A hard-disk recorder for recording TV broadcasting programs was developed several years ago. The audience can record programs into a large-capacity hard disk and can view (reproduce) the recorded programs at any time different from the on-the-air date and time irrespective of an actual program arrangement.

Therefore, the audience can record a program not broadcasted in the prime time into a hard disk and can view the recorded program (recorded content) at any time slot. Consequently, broadcasting business parties and advertisers can expect an audience rating similar to that of a program broadcasted in the prime time even for a program not broadcasted in the prime time.

Broadcasting business parties and advertisers cannot understand an advertisement effect caused by viewing (reproduction) recorded contents, just by the use of an audience-rating search performed for on-the-air broadcasting programs.

The audience is passive. Some programs recorded into a large-capacity hard disk are left as is without being viewed, in a huge number of contents.

SUMMARY OF THE INVENTION

The present invention has been made in consideration of the above situations. Accordingly, it is an object of the present invention to increase the audience rating of a program and the effect of an advertisement in the program by controlling the degree of exposure of a content and by leading the audience to view the content.

The foregoing object is achieved in one aspect of the present invention through a provision of a content-exhibition control apparatus for exhibiting a content in another apparatus, including generating means for generating degree-of-exposure control data used to control the degree of exposure of the content; exhibition control means for controlling the exhibition of the content recorded in the another apparatus, according to the degree-of-exposure control data generated by the generating means; and obtaining means for obtaining the state data of the content sent from the another apparatus, wherein the generating means generates the degree-of-exposure control data according to the state data of the content, obtained by the obtaining means.

The content-exhibition control apparatus may be configured such that the degree-of-exposure control data includes a content ID, an exposure type, and an exposure value, and the state data of the content includes a viewing condition and a degree-of-exposure condition.

The foregoing object is achieved in another aspect of the present invention through a provision of a content-exhibition control method for a content-exhibition control apparatus for exhibiting a content in another apparatus, including a generating step of generating degree-of-exposure control data used to control the degree of exposure of the content; an exhibition control step of controlling the exhibition of the content recorded in the another apparatus, according to the degree-of-exposure control data generated in the generating step; and an obtaining step of obtaining the state data of the content sent from the another apparatus, wherein the degree-of-exposure control data is generated in the generating step according to the state data of the content, obtained in the obtaining step.

In a content-exhibition control apparatus and a content-exhibition control method of the present invention, degree-of-exposure control data is generated to control the degree of exposure of a content, and the exhibition of the content recorded in another apparatus is controlled according to the generated degree-of-exposure control data. Therefore, the degree of exposure of the content is easily controlled to lead the user to view the content, and to improve the audience rating and an advertisement effect.

DESCRIPTION OF THE PREFERRED EMBODIMENTS

Figure 1:
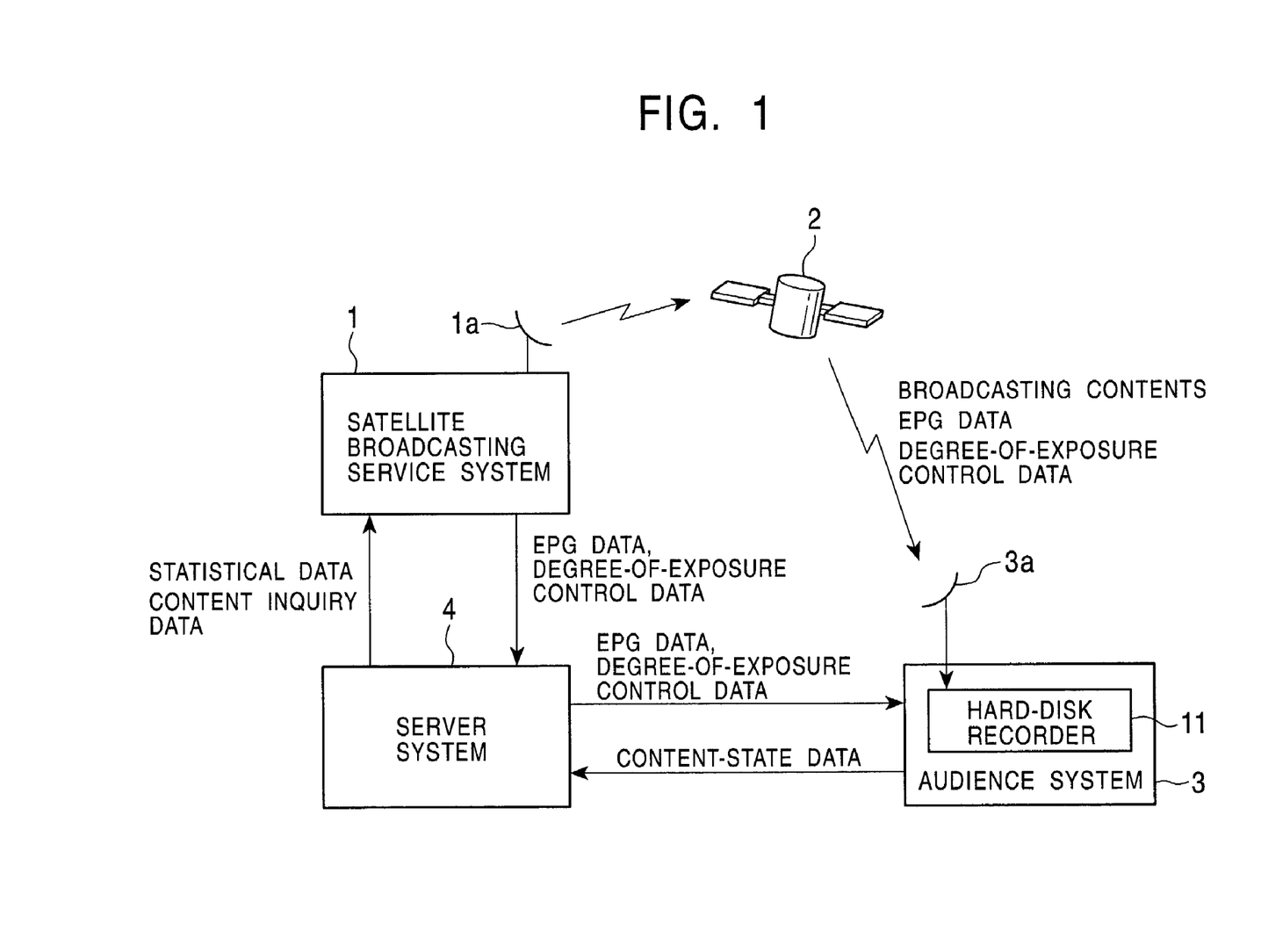
FIG. 1 is a block diagram of a viewing leading system according to an embodiment of the present invention.

FIG. 1 shows an example structure of a viewing leading system to which the present invention is applied. In this example structure, broadcasting contents, electronic-program-guide (EPG) data, and degree-of-exposure control data sent from an antenna 1a of a satellite-broadcasting service system 1 through a communication satellite 2 are received by an antenna 3a of an audience system 3 and distributed to a hard-disk recorder 11. The satellite broadcasting service system 1 is connected to a server system 4 through a communication network, such as the Internet, and asks the server system 4 to distribute the EPG data and the degree-of-exposure control data.

The hard-disk recorder 11 of the audience system 3 receives the EPG data and the degree-of-exposure control data sent from the satellite broadcasting service system 1 through the communication satellite 2 or sent from the server system 4 through a communication network, such as the Internet. The server system 4 periodically collects the state data (such as already viewed, not yet viewed, or deleted) of contents recorded into the hard-disk recorder 11.

The server system 4 calculates statistical data (such as audience rating) according to the content state data collected from the hard-disk recorder 11 of the audience system 3, and feeds it back to the satellite broadcasting service system 1 together with content-inquiry data (such as degree-of-exposure condition).

Figure 2:
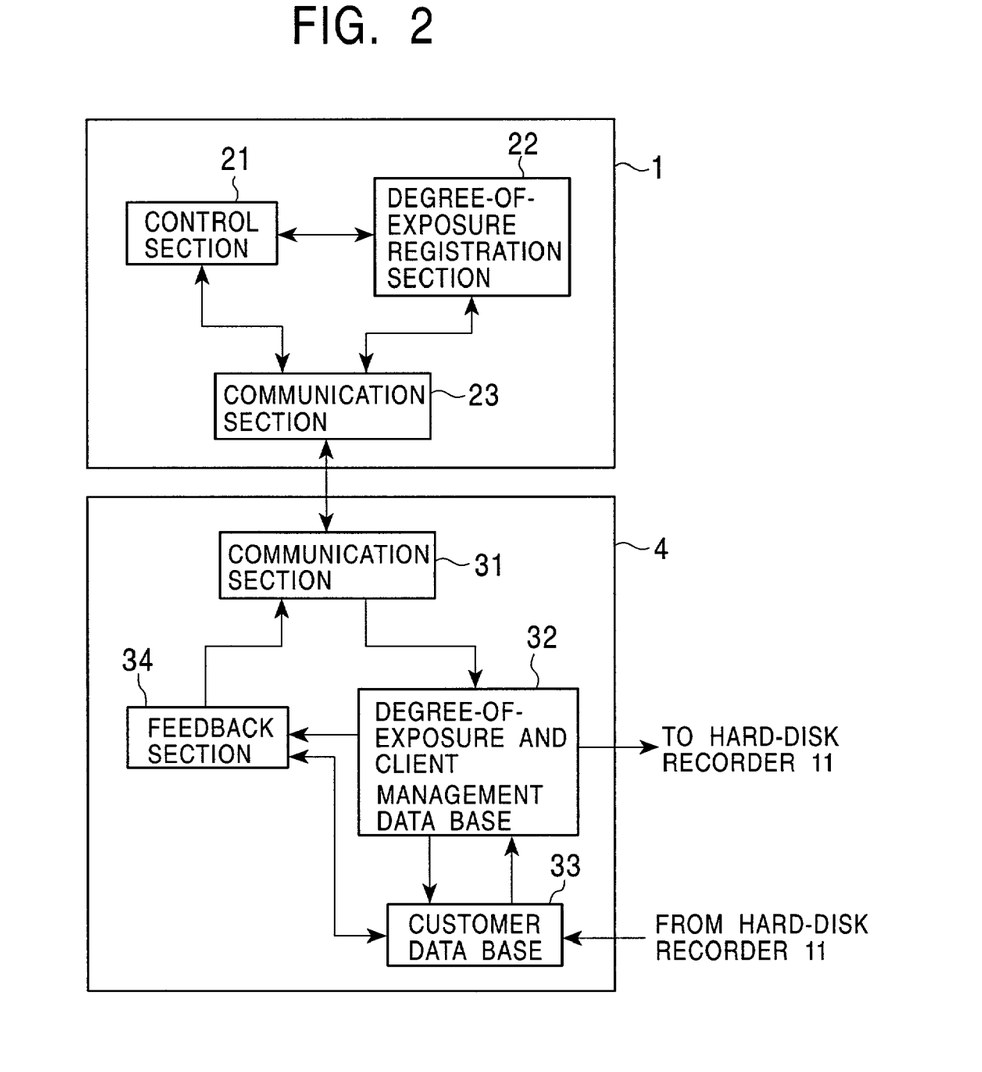
FIG. 2 is a block diagram of function modules in a satellite broadcasting service system and a server system shown in FIG. 1.

FIG. 2 is a block diagram showing an example structure of function modules in the satellite broadcasting service system 1 and the server system 4.

A degree-of-exposure registration section 22 of the satellite broadcasting service system 1 generates degree-of-exposure control data for a broadcasting content to be controlled and registers it into the server system 4 through a communication section 23, under the control of a control section 21. This registration is performed irrespective of the actual broadcasting date and time. It may be performed before, after, or the same time as the broadcasting. It is preferred that registration be performed soon after broadcasting at latest. Details of the degree-of-exposure data will be described later.

The communication section 23 of the satellite broadcasting service system 1 controls communications through wires, such as a telephone line or a cable, under the control of the control section 21. To transmit EPG data, broadcasting contents, or degree-of-exposure data, for example, communication is performed with the server system 4 through the communication section 23 to send and receive data.

A degree-of-exposure and client management data base 32 of the server system 4 stores degree-of-exposure control data registered by the satellite broadcasting service system 1 through a communication section 31, and also stores client information (in this example, information related to broadcasting business parties), the expected dates of broadcasting-content distributions, and the states of contents (such as whether orders for broadcasting contents to be distributed have been made or not, whether the broadcasting contents have been distributed or not, or the charges for the broadcasting contents have been paid or not) with their relationships being included.

A customer data base 33 of the server system 4 stores user-related information (such as user IDs, passwords, names, addresses, and preferences) sent from the hard-disk recorder 11 of the audience system 3 to use it for customer management. The customer data base 33 also stores the state data of contents, collected from the hard-disk recorder 11.

A feedback section 34 of the server system 4 feeds back information such as an inquiry (degree-of-exposure condition) for a content in the degree-of-exposure and client management data base 32 and statistical data (audience rating) calculated from the contents of the customer data base 33, to the satellite broadcasting service system 1 through the communication section 31.

The communication section 31 of the server system 4 controls communications through wires, such as telephone lines or cables. To receive EPG data, broadcasting contents, or degree-of-exposure control data, for example, communications are performed with the satellite broadcasting service system 1 through the communication section 31 to send and receive data.

Processing for generating degree-of-exposure control data may be performed by a client, an advertisement agency, or a content creator, instead of the satellite broadcasting service system 1 (broadcasting business parties).

Figure 3:
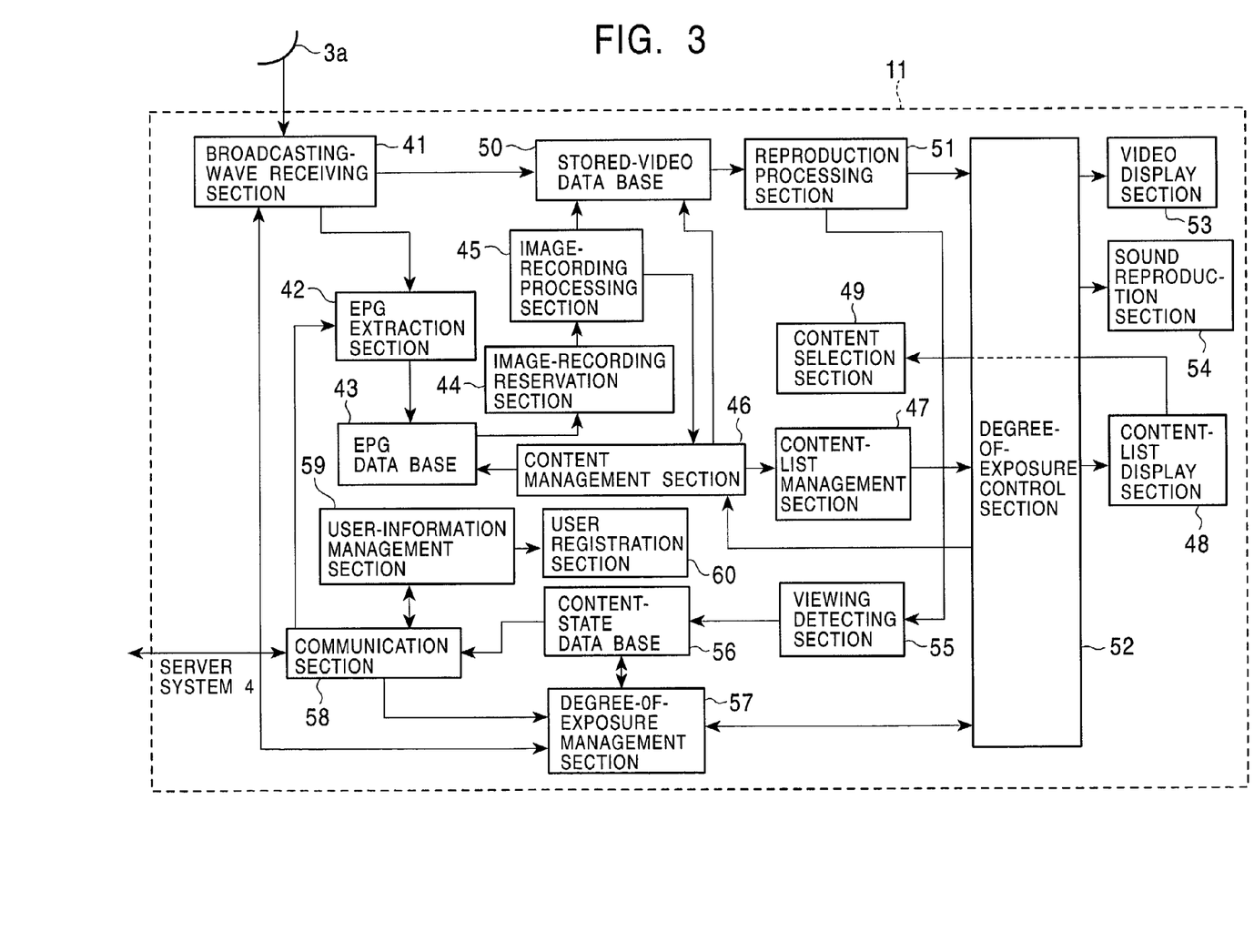
FIG. 3 is a block diagram of function modules in a hard-disk recorder shown in FIG. 1.

FIG. 3 is a block diagram showing an example structure of function modules in the hard-disk recorder 11.

A broadcasting-wave receiving section 41 receives broadcasting contents, EPG data, and degree-of-exposure control data, and applies predetermined processing, such as demodulation processing and error-correcting processing to the received data items.

An EPG extraction section 42 extracts the EPG data from the data items received by the broadcasting-wave receiving section 41, and stores it into an EPG data base 43. An image-recording reservation section 44 registers (reserves) a desired broadcasting content in advance so as to store it in an image-recording processing section 45 in the future. The user selects a desired content on an EPG list for registration. Alternatively, a content is automatically selected and registered according to the preference and custom of the user. When a broadcasting content for which the image-recording reservation section 44 has made image-recording reservation is broadcasted, the image-recording processing section 45 starts recording the content. The image-recording processing section 45 can also record manually or automatically the content being broadcasted.

A content management section 46 relates each content information stored in the EPG data base 43 with each video data stored in a stored-video data base 50. The content information and video data which are related with each other are collectively managed together with content-state data, such as "image-recording reservation" and "recorded."

The relations are made, for example, by content IDs. The same content IDs are recorded in advance both in the EPG data base 43 and the stored-video data base 50. The content state data is sent from the image-recording reservation section 44 or the image-recording processing section 45 to the content management section 46.

The content management section 46 also performs virtual-channel management, reproduction-schedule management, or a reproduction start designation according to the schedule. Details of a virtual channel and the reproduction schedule will be described later.

A content-table management section 47 generates an EPG list, a recorded-content list, and a reproduction-schedule table. A content-list display section 48 displays on a display 94 (FIG. 4) the EPG list, the recorded-content list, or the reproduction-schedule table input from the content-table management section 47.

A content selection section 49 identifies a content selected by the user by a cursor manipulation in the reproduction-schedule table displayed by the content-list display section 48 on the display 94. The video data corresponding to the identified (selected) content is read from the stored-video data base 50 and output to a reproduction processing section 51.

The stored-image data base 50 stores contents recorded by the image-recording processing section 45. Video data stored in the stored-video data base 50 is related, for example, with the broadcasting channel, the broadcasting date and time (recording date and time), or the content ID obtained from the EPG data, and is stored in the stored-video data base 50 by a moving-picture-experts-group-2 (MPEG2) compression format.

The reproduction processing section 51 reads video data stored in the stored-video data base 50, separates video and sound, and decompresses them by the MPEG method.

A degree-of-exposure control section 52 controls a method for exhibiting the list of video data or content information (such as the names of programs) to the user. More specifically, the degree-of-exposure control section 52 inquires of a degree-of-exposure management section 57 the content ID of a content selected by a content selection section 49, obtains a corresponding degree-of-exposure designation, and changes the content-exhibition method according to the type of exposure and the value of exposure specified by the degree-of-exposure designation. With this operation, the size and color, for example, of the characters of the title corresponding to each content are changed. Details of exhibition-method control (degree-of-exposure control) will be described later.

A video display section 53 displays (reproduces) video input from the reproduction processing section 51 through the degree-of-exposure control section 52. A sound reproduction section 54 outputs (reproduces) sound input from the reproduction processing section 51 through the degree-of-exposure control section 52.

A viewing detecting section 55 determines whether the user sufficiently views the content being reproduced. When the content is reproduced continuously for a predetermined time period or more, for example, the reproduction processing section 51 informs of the operation, a "sufficiently viewed" condition is detected, and the result of detection is stored in a content-state data base 56. A view detecting method is not limited to that described above. The number of times viewing is performed, or the level of viewing (such as a "half viewed" condition) may be detected.

The content management section 46 registers each content into the content-state data base 56, and the viewing detecting section 55 stores the viewing condition (viewing performance) of each content therein. The stored data is periodically collected by the server system 4 through a communication section 58. A user ID obtained from a user-information management section 59 is added to data to be transmitted. A degree-of-exposure management section 57 stores degree-of-exposure control data in the content-state data base 56.

The degree-of-exposure management section 57 extracts the degree-of-exposure control data received by the broadcasting-wave receiving section 41, and stores it into the content-state data base 56. The degree-of-exposure management section 57 can also store degree-of-exposure control data sent from the server system 4 through the communication section 58 into the content-state data base 56. The degree-of-exposure management section 57 refers to the content-state data base 56 according to the content ID sent from the degree-of-exposure control section 52, reads the degree-of-exposure control data corresponding to the content, and sends (back) the degree-of-exposure designation included in the degree-of-exposure control data to the degree-of-exposure control section 52. The degree-of-exposure management section 57 can automatically generate degree-of-exposure control data in the hard-disk recorder 11 and store it in the content-state data base 56.

The communication section 58 controls communications through wires, such as telephone lines or cables. Communications are performed with the server system 4 through the communication section 58 to send and receive broadcasting contents, EPG data, or degree-of-exposure control data.

The user-information management section 59 allows user information (such as user IDs, passwords, names, addresses, and preferences) to be input or changed. When content-state data stored in the content-state data base 56 is sent to the server system 4, the user-information management section 59 adds the user ID to the content-state data and sends to the server system 4.

A user-information registration section 60 registers user information (such as a user ID, a password, the name, the address, and preferences) input by the user. The registered user information is sent to the server system 4 through the user-information management section 59 and the communication section 58. With this operation, the customer data base 33 of the server system 4 adds or changes a user-information (customer information) entry.

Figure 4:
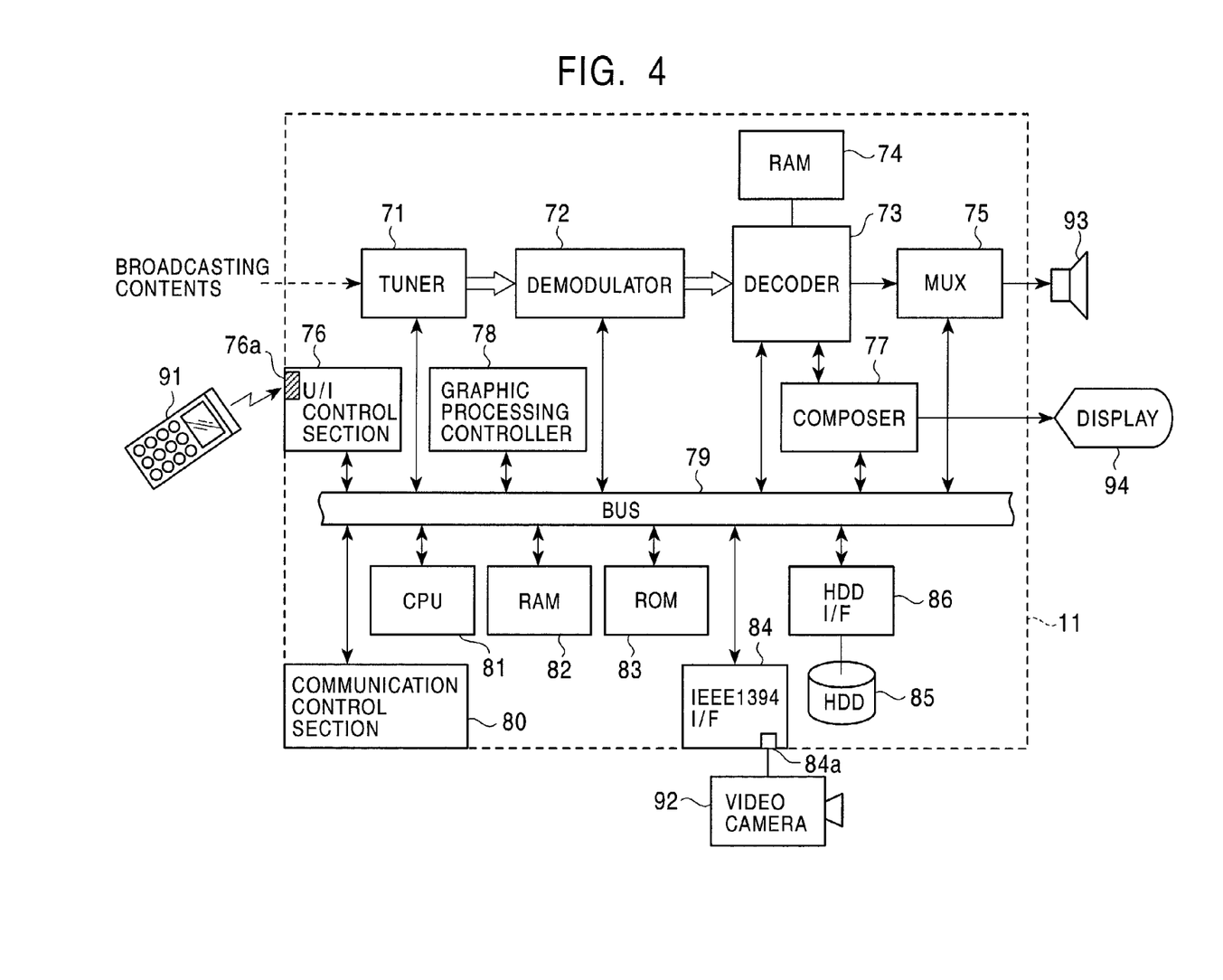
FIG. 4 is a block diagram of the hardware of the hard-disk recorder shown in FIG. 1.

FIG. 4 is a block diagram showing an example hardware structure of the hard-disk recorder 11. The hard-disk recorder 11 can record a huge amount of video in a hard-disk drive 85 having a huge storage capacity, and can correctly hold a user's intention to implement recorded-video storage and management. The hard-disk recorder 11 can be mounted as an audio-visual unit. Like a set-top box (STB), it can be formed as a unit together with a TV receiver.

A broadcasting wave received by the antenna 3a is sent to a tuner 71. The broadcasting wave conforms to a predetermined format and may include, for example, EPG data. In the current case, the broadcasting wave is a satellite broadcasting wave. The broadcasting wave is not limited to that. It may be a terrestrial wave, a wave sent through a wire, or a wave sent via radio.

The tuner 71 tunes to a predetermined-channel broadcasting wave, that is, selects a station under the control of a CPU 81, and outputs received data to a demodulator 72. According to whether a broadcasting wave to be transmitted is analog or digital, the structure of the tuner 71 can be changed or extended as appropriate. The demodulator 72 demodulates the received data which has been digitally modulated and outputs to a decoder 73.

In digital satellite broadcasting, for example, digital data received by the tuner 71 and demodulated by the demodulator 72 is a transport stream into which AV data compressed by the MPEG2 method and data for data broadcasting have been multiplexed. The AV data includes video information and sound information constituting a broadcasting content itself, and the data for data broadcasting includes data (such as EPG data) attached to the broadcasting content.

The decoder 73 separates the transport stream sent from the demodulator 72 into the AV data compressed by the MPEG method and the data for data broadcasting. The decoder 73 also separates the real-time AV data compressed by the MPEG2 method into compressed video data and compressed audio data. The separated audio data is pulse-code-modulation (PCM) decoded, combined with additional sound, and output to a speaker 93 through a mixer (MUX) 75. The separated video data is decompressed, and output to the display 94 through a composer 77. A random access memory (RAM) 74 can store work data.

The speaker 93 outputs the audio signal sent from the mixer 75, and the display 94 displays (reproduces) the video signal sent from the composer 77.

The decoder 73 also sends the data for data broadcasting separated from the transport stream, to the CPU 81 through a bus 79. With this operation, the CPU 81 executes predetermined processing according to a predetermined application to generate an EPG list or a reproduction schedule table.

A user interface (U/I) control section 76 is a module for processing user input operations. When the user operates a remote commander 91 formed of operation pushbuttons and switches, for example, a light receiving section 76a receives an operation signal (IR signal) which is light emitted from an infrared-ray emitting section (not shown) and outputs to the CPU 81.

A graphic processing controller 78 is a special controller for generating screens under the control of the CPU 81, and is provided, for example, with a high-definition drawing function for super video graphic array (SVGA) systems and extended graphic array (XGA) systems. The graphic processing controller 78 draws, for example, a graphical-user-interface (GUI) operation screen, an EPG-list screen or a schedule screen.

A communication control section 80 controls communications via wires such as telephone lines or cables. Communications with the server system 4 are performed through the communication control section 80 to send and receive broadcasting contents, EPG data, and degree-of-exposure control data. Communications with external units are also performed through the communication control section 80 to send and receive data.

The CPU 81 is a main controller for controlling the operations of the entire hard-disk recorder 11, and executes various applications on a platform provided by an operating system (OS). The CPU 81 executes, for example, recording or reproduction of a content according to an operation signal input through a remote commander 91 and the user interface control section 76.

A RAM 82 is a writable volatile memory used for loading an execution program of the CPU 81 and for writing work data for the execution program. A read only memory (ROM) 83 is used for storing self-diagnosis and initialization programs to be executed when the hard-disk recorder 11 is turned on, and control codes for hardware operations.

The Institute of Electrical and Electronics Engineers (IEEE) 1394 interface (I/F) 84 is a serial high-speed interface which allows data transmission and receiving about at 50 Mbps. An IEEE-1394 port 84a is connected to a video camera 92 conforming to IEEE-1394.

The hard-disk drive (HDD) 85 is a random-access-allowed external storage unit which can store programs and data as predetermined-format files, and has, for example, a large capacity of about 50 GB (or 100 GB or more). The hard-disk drive 85 is connected to the bus 79 through a hard-disk interface 86, and stores information such as EPG data, broadcasting contents, content states, degree-of-exposure control data, and a schedule.

Details of degree-of-exposure control data will be described next by referring to FIG. 5.

Figure 5A:
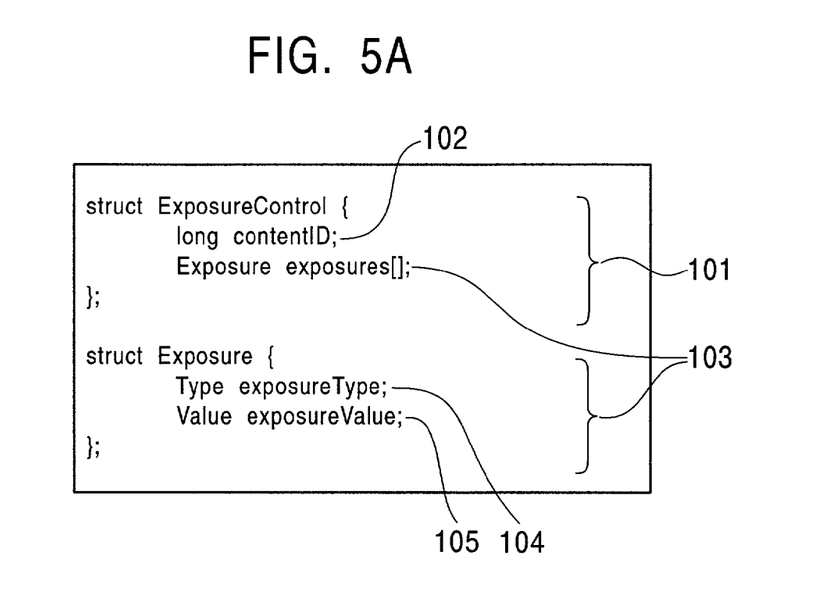
FIG. 5 is a view showing degree-of-exposure control data.

FIG. 5A shows an example structure of the degree-of-exposure control data. The degree-of-exposure control data 101 is formed of a content ID 102 and a degree-of-exposure designation 103. The degree-of-exposure designation 103 is further formed of an exposure type 104 and an exposure value 105.

The content ID 102 is identification information for uniquely identifying a broadcasting content, and is specified by a broadcasting business party or an EPG distribution business party by the use of a different number. It is necessary for the content ID 102 and EPG data to identify the corresponding content itself and the detailed information (such as the program name, the broadcasting channel, and the broadcasting date and time) of the content both in the server system 4 and the audience system 3.

The degree-of-exposure designation 103 specifies a content-exhibition method. The exposure type 104 and the exposure value 105 specify it in detail.

Figure 5B:
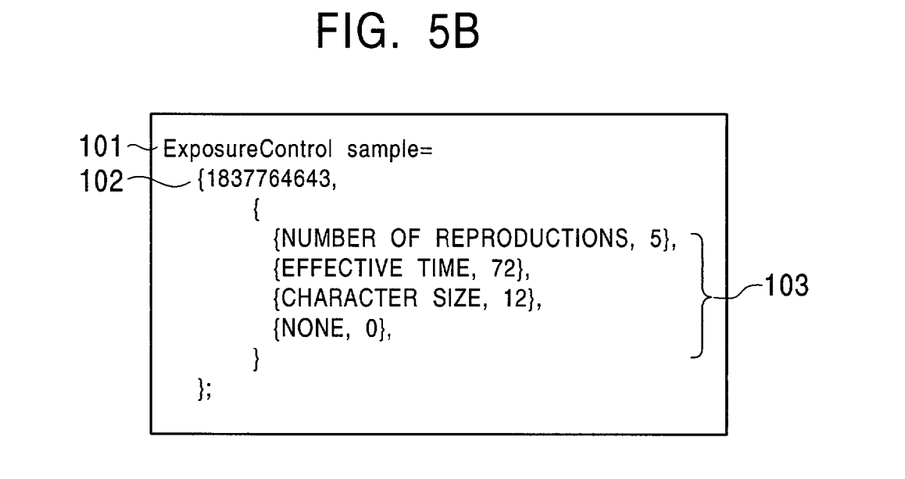

FIG. 5B shows an example of the degree-of-exposure control data. In this case, the content ID 102 is "1837764643" and the exposure type 104 and the exposure value 105 of the degree-of-exposure designation 103 include "number of reproductions, five (times)," "effective time, 72 (hours)," "character size, 12 (points)," and "none, 0." This means that the broadcasting content having a content ID 102 of "1837764643" is to be reproduced (in a schedule) five times within an effective time of 72 hours, and the name of the program is displayed on the reproduction schedule table with a character size of 12 points.

As another example of the degree-of-exposure designation 103, a combination of the exposure type 104 and the exposure value 105 may be "character color, red," "sound volume, +2," or "priority, 3." Each combination corresponds to cases in which the program name is displayed by red characters in a reproduction schedule list, in which reproduction is performed at a sound volume of +2 compared with that for other contents, or in which a degree of exposure (exhibition method) is determined by the hard-disk recorder 11 according to a predetermined rule.

In the degree-of-exposure designation 103 of the degree-of-exposure control data 101, a plurality of combinations of exposure types 104 and exposure values 105 can be specified. When a plurality of combinations are specified, a special combination ("none, 0" in the case shown in FIG. 5B) of an exposure type 104 and an exposure value 105 is used to indicate the end of the combinations.

Figure 6:
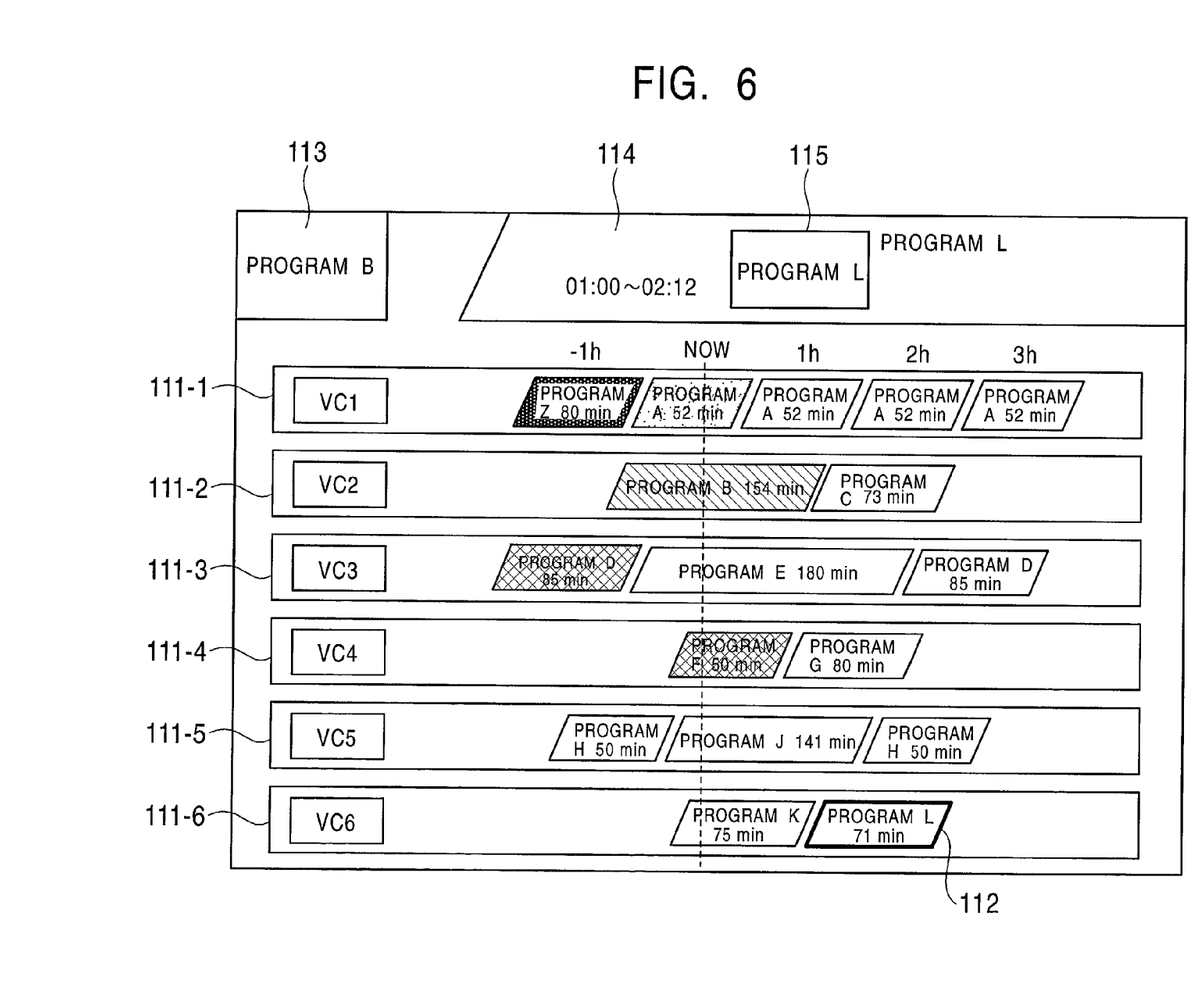
FIG. 6 is a view showing a reproduction schedule table.

FIG. 6 shows an example structure of a reproduction schedule table (time table) which the CPU 81 of the hard-disk recorder 11 displays on the display 94. In the figure, the vertical axis indicates virtual channels and the horizontal axis indicates time. In the time axis, against a boundary ("Now" in FIG. 6) indicating the current reproduction position, the left-hand side shows the "past" and the right-hand side shows the "future." The position indicating the current reproduction moves in the right direction relative to the entire scheduled programs as the time passes, or the entire scheduled programs move in the left direction relative to the reproducing position as the time passes.

Channels specified by classifications (categories) are assigned to virtual channels 111-1 to 111-6. For example, "music" is specified for the virtual channel 111-1, "sports" is specified for the virtual channel 111-2, "drama s" is specified for the virtual channel 111-3, "movies" is specified for the virtual channel 111-4, "news" is specified for the virtual channel 111-5, and "others" (not included in the above categories) is specified for the virtual channel 111-6.

In the virtual channels 111-1, a program Z is scheduled and a program A is scheduled four times, and each program is displayed by an icon. In this case, the program Z is to be deleted and is displayed by a light-colored icon. One of the programs A (first one in the four programs) has already been viewed and characters in its icon are displayed in yellow. Since the other three programs A, scheduled to be broadcasted the second time and subsequent times in the four programs A, have not yet been viewed, characters of their icons are displayed in white.

In the virtual channel 111-2, a program B and a program C are scheduled. In this case, the program B is currently being viewed and the whole of its icon is displayed in yellow. The program B is reproduced in a reproduction area 113. Since the program C has not yet been viewed, characters in its icon is displayed in white.

In the virtual channel 111-3, a program D, a program E, and another program D are scheduled. In this case, the program D, which is scheduled as a first program, has already been viewed and characters in its icon are displayed in yellow. Since the program E or the program D scheduled thereafter has not yet been viewed, characters in their icons are displayed in white.

In the virtual channel 111-4, a program F and a program G are scheduled. In this case, the program F has already been viewed and characters in its icon are displayed in yellow. Since the program G has not yet been viewed, characters in its icon is displayed in white.

In the virtual channel 111-5, a program H, a program J, and another program H are scheduled. In this case, the program H, the program J, or the another program H has not yet been viewed, characters in their icons are displayed in white.

In the virtual channel 111-6, a program K and a program L are scheduled, for example. In this case, since the program K or the program L has not yet been viewed, characters in their icons are displayed in white. The program L is being selected by a selection cursor 112. A selected-information display area 114 displays information related to the program L, and a content display area 115 shows a typical scene (still picture or moving picture) of the program L.

Recorded contents are assigned time-sequentially, namely, in the order in which they are to be reproduced, by categories to the reproduction schedule table formed of the virtual channels 111-1 to 111-6 in this way. Priority is given to the arrangement of the recorded contents in each of the virtual channels 111-1 to 111-6, for example, in the hard-disk recorder according to information, such as the preference and custom of the user.

In addition, in the reproduction schedule table, since the hard-disk recorder 11 controls the display of icons according to whether the corresponding programs have been viewed, displays information of the recorded content selected by the selection cursor 112, and displays the current time position ("Now" in the case shown in FIG. 6), the user can select and view a desired recorded program within a short time period, and can easily check a reproduction position (how far the program has been viewed) in the program currently being reproduced.

Further, since not only a program (program Z in the case shown in FIG. 6) soon to be deleted is disposed in the farthest "past" in the time axis but also programs are basically arranged from those having older reproduction times to those having newer reproduction times, the user can search for recorded contents at a glance.

In the case shown in FIG. 6, however, it is difficult to lead the user to view a program which the broadcasting business party recommends among programs automatically scheduled. Therefore, in the present invention, degree-of-exposure control data generated by the broadcasting business party is recorded into the hard-disk recorder 11 to control the degrees of exposure of the programs such that the user can be lead to view programs which the broadcasting business party and advertisement agencies recommend.

Processing for controlling the degree of exposure of a recorded content will be described below by referring to a flowchart shown in FIG. 7.

In step S31, the user registration section 60 of the hard-disk recorder 11 registers user information input by the user, such as the user ID, password, name, address, and preference. In step S32, the user-information management section 59 sends the user information registered in the process of step S31 to the server system 4.

In step S11, the server system 4 receives the user information sent from the hard-disk recorder 11. In step S12, the server system 4 registers (stores) the user information received in the process of step S11 in the customer data base 33.

In step S1, the satellite broadcasting service system 1 distributes broadcasting contents and EPG data to the hard-disk recorder 11 of the audience system 3 through the antenna 1a and the communication satellite 2. The satellite broadcasting service system 1 may distribute both or either of broadcasting contents and EPG data through the server system 4.

In step S33, the broadcasting-wave receiving section 41 of the hard-disk recorder 11 receives the broadcasting contents and EPG data distributed (sent) from the satellite broadcasting service system 1 or the server system 4. In step S34, the image-recording processing section 45 of the hard-disk recorder 11 records the broadcasting contents received by the process of step S33 into the stored-video data base 50.

In step S2, the degree-of-exposure registration section 22 of the satellite broadcasting service system 1 generates degree-of-exposure control data 101 (FIG. 5) related to a broadcasting content for which the degree of exposure is to be controlled, and sends it to the server system 4. The degree-of-exposure registration section 22 of the satellite broadcasting service system 1 may superpose the degree-of-exposure data 101 on the broadcasting content and distribute it. Alternatively, the degree-of-exposure registration section 22 may distribute the degree-of-exposure data 101 to the hard-disk recorder 11 through the server system 4.

In steps S13 and S14, the server system 4 receives the degree-of-exposure control data 101 sent from the satellite broadcasting service system 1 and registers (stores) it in the degree-of-exposure and client management data base 32. In step S15, the server system 4 reads the degree-of-exposure control data 101 registered into the degree-of-exposure and client management data base 32 in the process of step S14, and sends it to the hard-disk recorder 11.

In step S35, the degree-of-exposure control section 57 of the hard-disk recorder 11 receives the degree-of-exposure control data 101 sent from the server system 4 through the communication section 58, and stores it into the content-state data base 56.

When the user or the content management section 46 instructs reproduction of a predetermined recorded content, the degree-of-exposure control section 52 inquires of the degree-of-exposure management section 57 the content ID of the recorded content, sent from the reproduction processing section 51. With this operation, the degree-of-exposure management section 57 reads the degree-of-exposure control data corresponding to the content ID from the content-state database 56, and sends the degree-of-exposure designation 103 (FIG. 5) included in the data to the degree-of-exposure control section 52. The degree-of-exposure control section 52 controls the degree of exposure (exhibition method) of the recorded content according to the degree-of-exposure designation 103 obtained from the degree-of-exposure management section 57. With this operation, the exhibition method of the recorded content is changed, for example, to that shown in FIG. 8.

Figure 8:
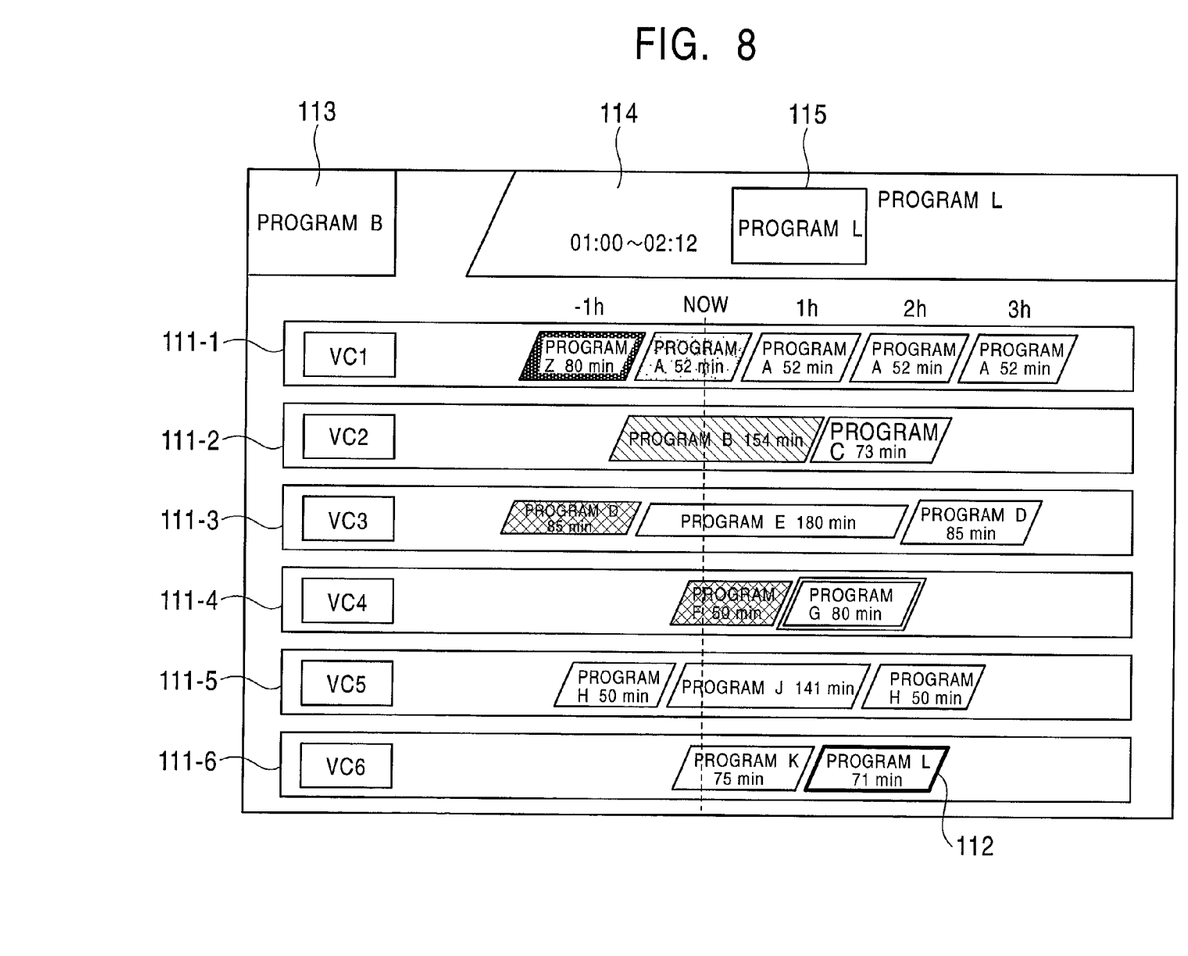
FIG. 8 is a view of a reproduction schedule table in which degrees of exposure are controlled.

In the case shown in FIG. 8, in the virtual channel 111-1, the degree of exposure is controlled such that the program A is repeatedly scheduled (in this case, scheduled to be broadcasted four times). In the virtual channel 111-2, the degree of exposure is controlled such that characters in the icon of the program C are displayed larger. In the virtual channel 111-3, the degree of exposure is controlled such that the icon of the program D scheduled after the program E is displayed larger than those of the program E and the program D scheduled first. In the virtual channel 111-4, the degree of exposure is controlled such that the color and size of the frame of the icon of the program G are changed.

In the exhibition method of contents shown in FIG. 8, the strength of visual impression is controlled. It is also possible that the user is more effectively led to view a predetermined content by controlling the strength of auditory impression with a sound volume being changed, by controlling the strength of audiovisual impression (display and sound are enhanced), or by controlling a reproduction speed (for example, a high-priority content is reproduced at a low speed or a standard speed whereas a low-priority content is reproduced at a high speed).

Figure 7:
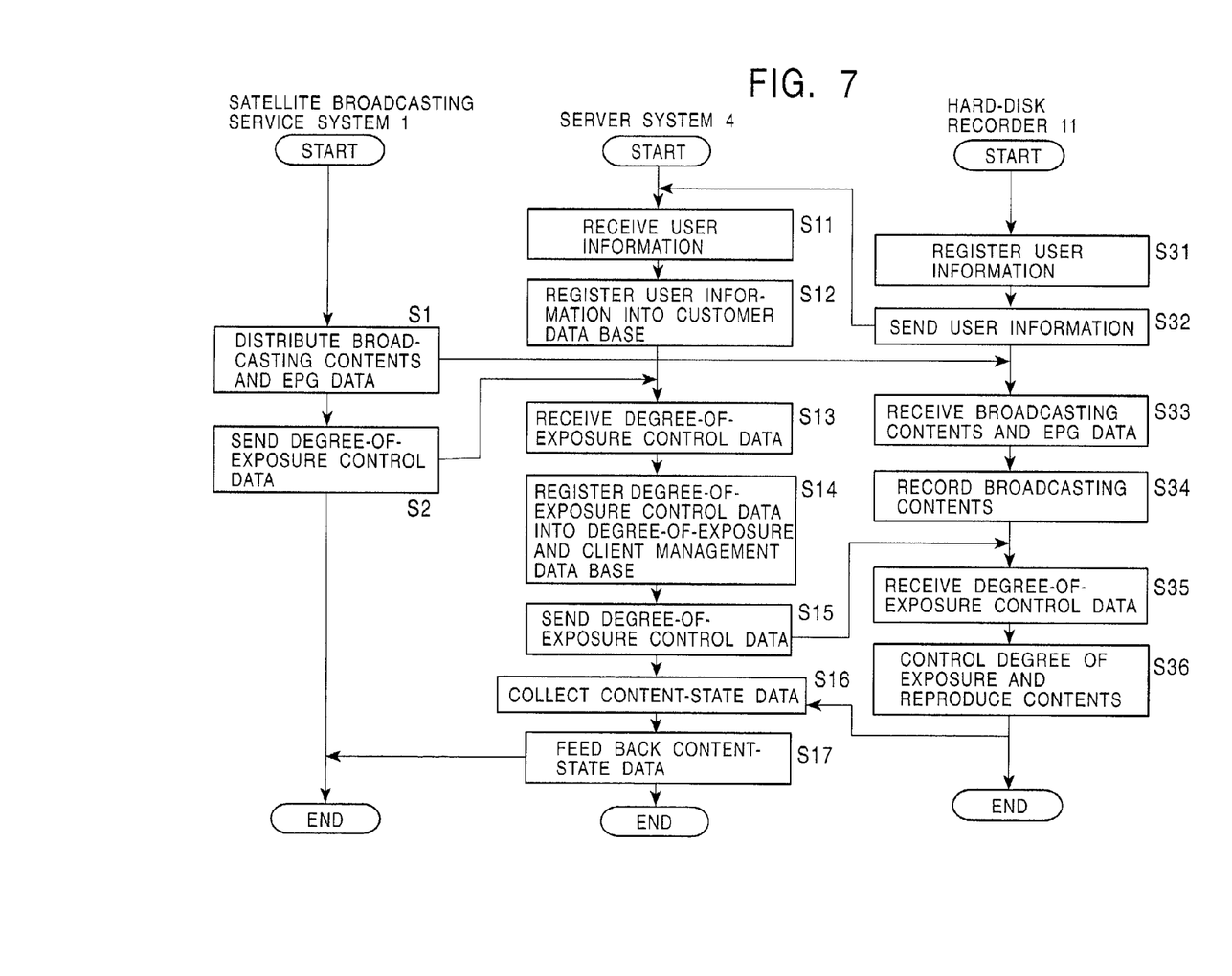
FIG. 7 is a flowchart of degree-of-exposure control processing.

Back to FIG. 7, in step S16, the server system 4 collects the content-state data stored in the content-state data base 56 of the hard-disk recorder 11, and stores it into the customer database 33. In step S17, the feedback section 34 of the server system 4 feeds back the content state data collected in the process of step S16 to the satellite broadcasting service system 1.

As described above, since the satellite broadcasting service system 1 collects the content-state data, which indicates whether the content for which the degree of exposure was controlled according to the distributed degree-of-exposure control data 101 was viewed by users, the audience rating of the content can easily be checked.

Figure 9:
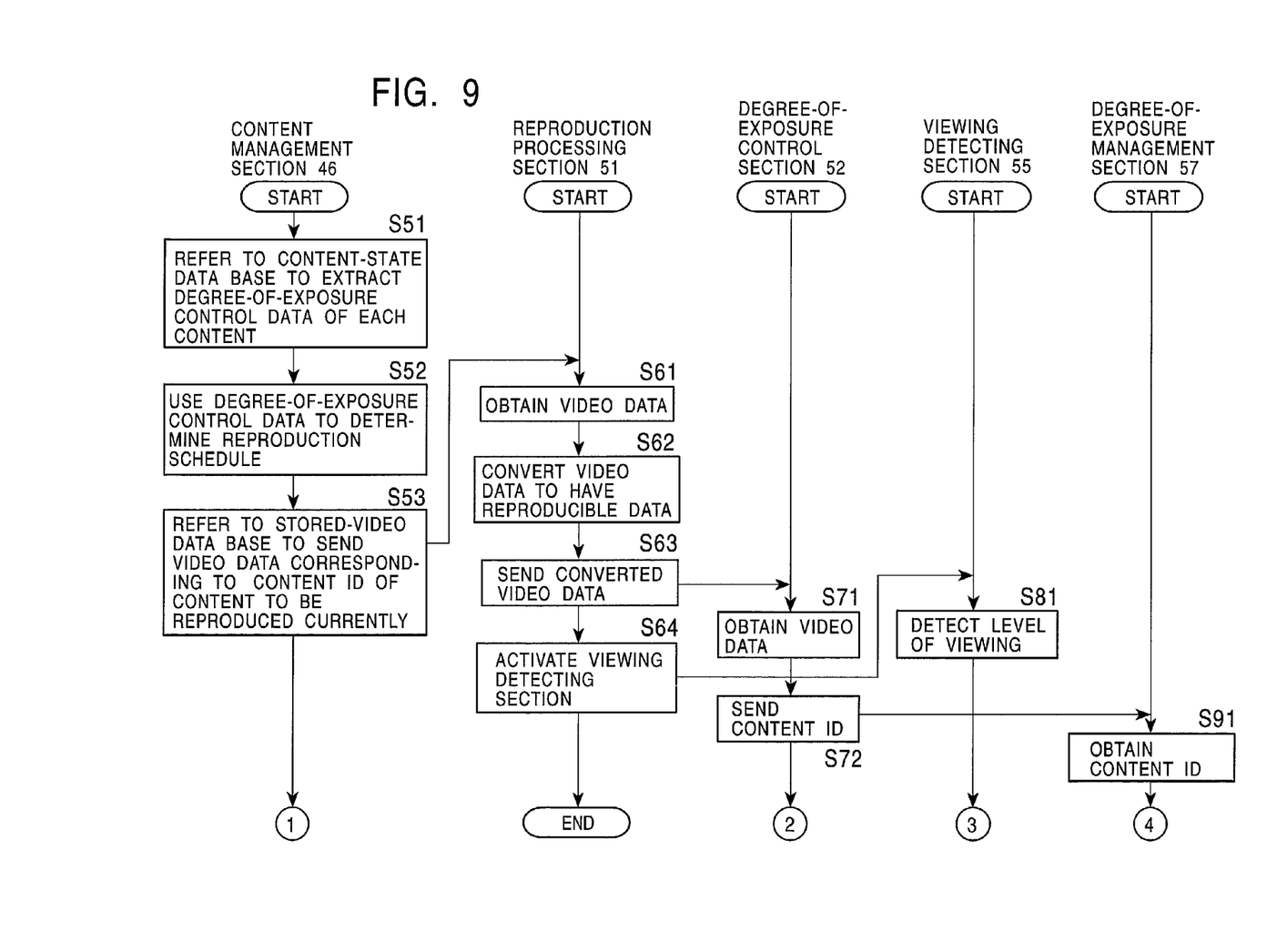
FIG. 9 is a flowchart of degree-of-exposure control processing.
Figure 10:
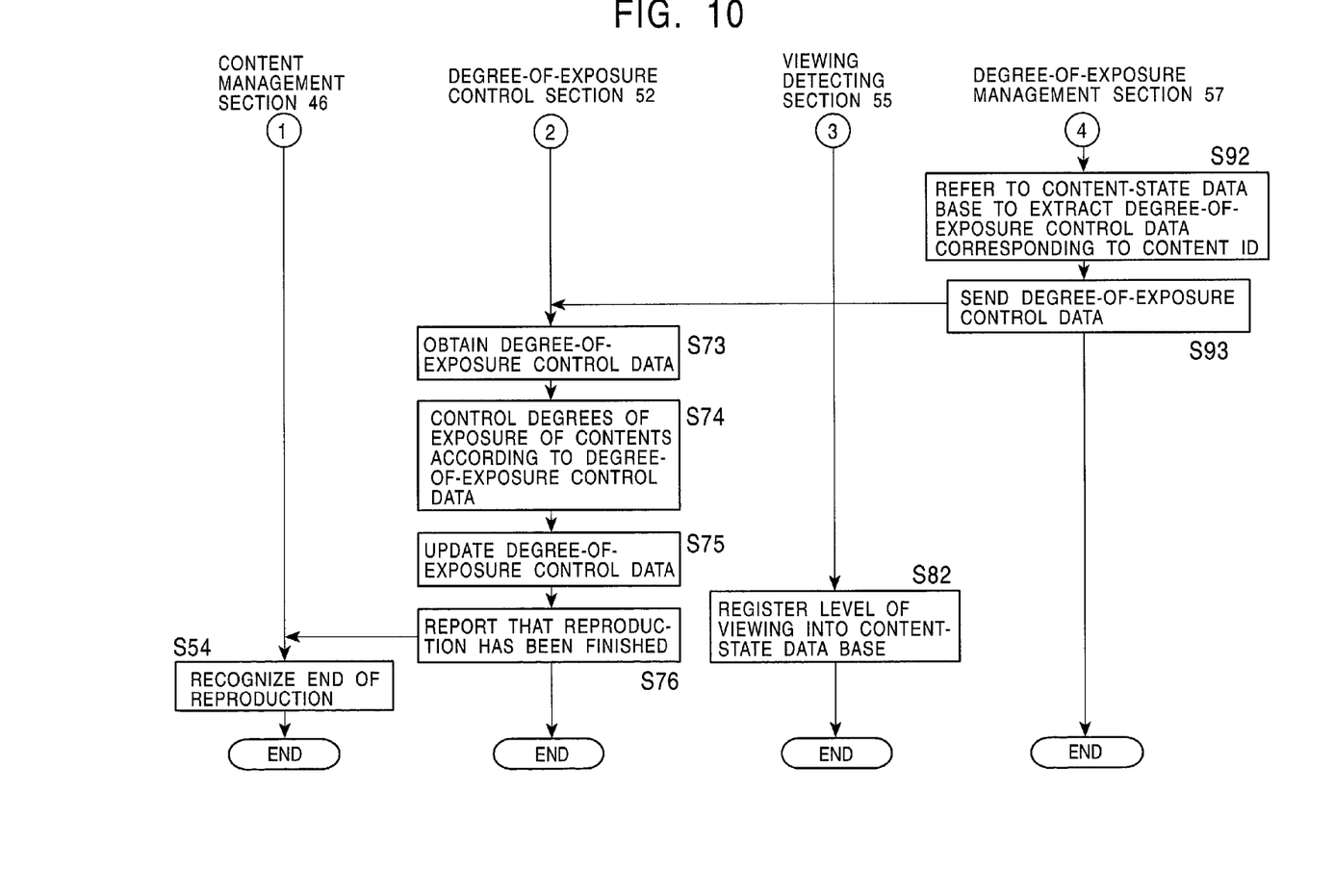
FIG. 10 is a flowchart following that shown in FIG. 9.

Processing for controlling the degree of exposure of a recorded content, executed by the hard-disk recorder 11 will be described next by referring to flowcharts shown in FIG. 9 and FIG. 10.

In step S51, the content management section 46 refers to the content-state data base 56 to extract the degree-of-exposure control data 101 (FIG. 5) of each content, required to generate a reproduction schedule table. In step S52, the content management section 46 uses the degree-of-exposure control data 101 extracted in the process of step S51 to determine a reproduction schedule. It is assumed here that only the number of times reproduction is performed is specified for each content. More specifically, the content management section 46 assigns recording contents for which the number of times reproduction is performed is set to one or more to the virtual channels 111-1 to 111-6 and the whole schedule is determined so as to satisfy the number of times reproduction is performed for each content as mush as possible.

In step S53, the content management section 46 refers to the stored-video data base 50 to read the video data corresponding to the content ID of the content to be currently reproduced and sends it to the reproduction processing section 51.

In step S61, the reproduction processing section 51 obtains the video data sent from the content management section 46. In step S62, the reproduction processing section 51 decompresses the video data obtained in the process of step S61, separates video and sound, and converts to a reproducible format.

In step S63, the reproduction processing section 51 sends the video data converted to the reproducible format in the process of step S62 to the degree-of-exposure management section 52 together with the content ID.

In step S64, the reproduction processing section 51 activates the viewing detecting section 55. In step S81, when the viewing detecting section 55 is activated by the reproduction processing section 51, the viewing detecting section 55 detects the level (for example, if the content being reproduced has been viewed or not) of viewing for the content being reproduced.

In step S71, the degree-of-exposure control section 52 obtains the video data and the content ID sent from the reproduction processing section 51. In step S72, the degree-of-exposure control section 52 sends the content ID obtained in the process of step S71 to the degree-of-exposure management section 57 and inquires the degree-of-exposure control data 101.

In step S91, the degree-of-exposure management section 57 obtains the content ID sent from the degree-of-exposure control section 52. In step S92, the degree-of-exposure management section 57 refers to the content-state data base 56 according to the content ID obtained in the process of step S91 to extract the degree-of-exposure control data 101 corresponding to the content ID. In step S93, the degree-of-exposure management section 57 sends the degree-of-exposure designation 103 included in the degree-of-exposure control data 101 extracted in the process of step S92 to the degree-of-exposure control section 52.

In step S73, the degree-of-exposure control section 52 obtains the degree-of-exposure control data 101 (degree-of-exposure designation 103) sent from the degree-of-exposure management section 57. In step S74, the degree-of-exposure control section 52 controls the degree of exposure of the recorded content according to the degree-of-exposure control data 101 obtained in the process of step S73. With this operation, a reproduction schedule table such as that shown in FIG. 8 is displayed.

In this processing example, since only the number of times reproduction is performed is specified in the degree-of-exposure designation 103, manipulation based on a degree of exposure is not applied to video or sound. The degree-of-exposure control section 52 checks an exposure value 105, and does not perform any processing afterwards if the value is zero.

In step S75, the degree-of-exposure control section 52 updates the degree-of-exposure control data. In other words, every time re-scheduling is performed, the exposure value 105 is updated. When a content for which the number of times reproduction is performed has been set to five is not reproduced (viewed), for example, the exposure value is updated from five to four in re-scheduling. Until the content is reproduced (viewed), the exposure value is updated to three, two, one, and zero in that order.

In step S82, the viewing detecting section 55 stores (accumulates) the level of viewing detected in the process of step S81 in the content-state data base 56.

In step S76, the degree-of-exposure control section 52 reports to the content management section 46 that reproduction has been finished. In step S54, the content management section 46 recognizes the end of reproduction reported from the degree-of-exposure control section 52, and performs re-scheduling for the reproduction schedule table.

Figure 11:
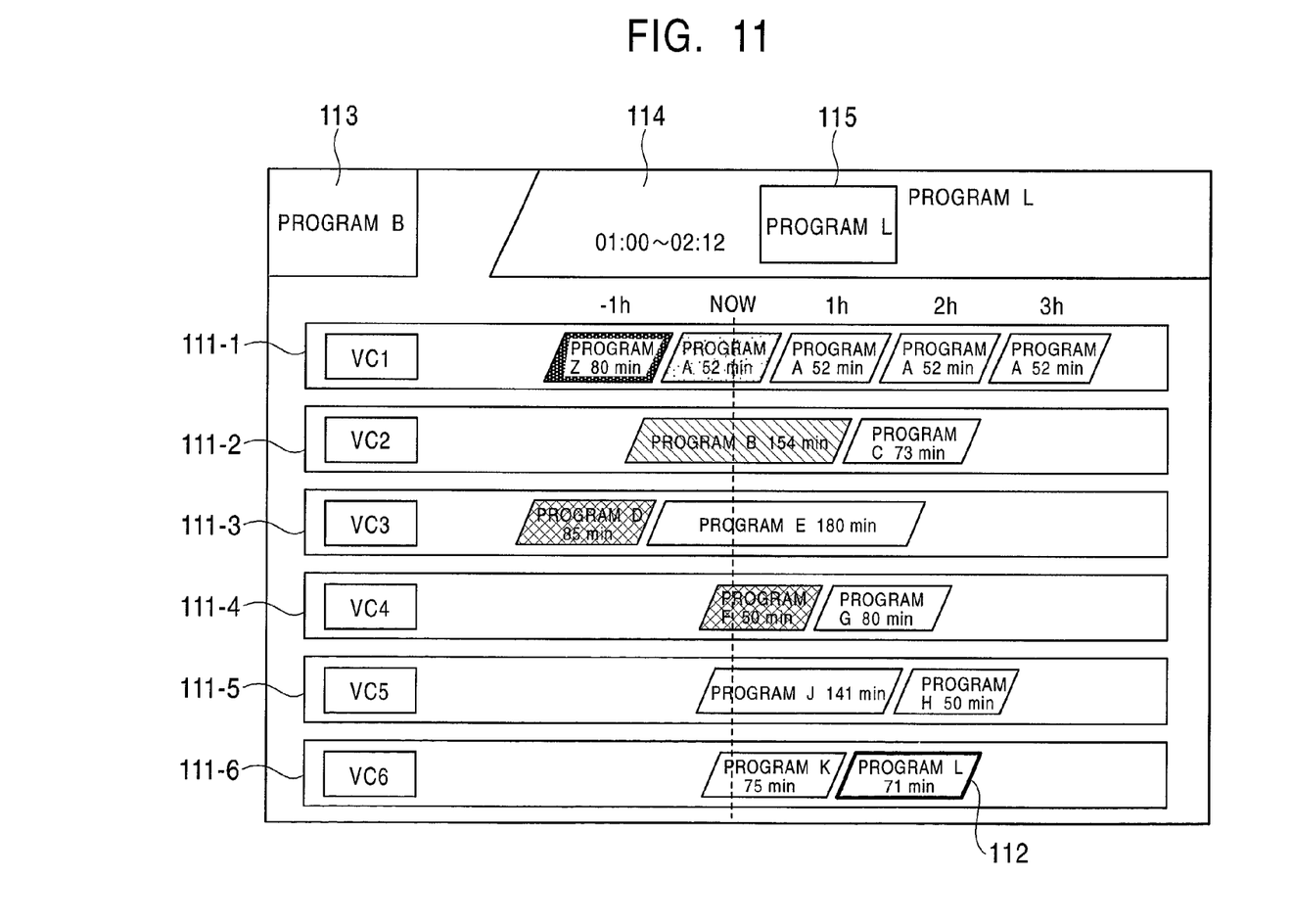
FIG. 11 is a view of a reproduction schedule table for which re-scheduling is performed.

With this operation, the reproduction schedule table shown in FIG. 6 is changed, for example, to that shown in FIG. 11. In the case shown in FIG. 11, since the program D in the virtual channel 111-3 has been already viewed, it is not scheduled in the "future." Since the program H in the virtual channel 111-5 has not yet been viewed, it is deleted from the "past" and re-scheduled in the "future."

As described above, broadcasting business parties and advertisers control the degrees of exposure of contents recorded in the hard-disk recorder 11 installed in the house of the audience. Therefore, the following advantages are obtained.

(1) Advertisers and broadcasting business parties can increase the audience probability (expected value) of a recorded content to a level obtained when it is broadcasted in the prime time.

(2) Advertisers and broadcasting business parties can change the degree of exposure of a content for each audience to effectively provide an advertisement. When a degree of exposure is controlled according to the preference of an audience, for example, a higher advertisement effect is obtained.

(3) When contents recorded in the hard-disk drive 85 are automatically reproduced, stored contents are prevented from being left unused without reproduction.

(4) Since a content continues to be exhibited (scheduled repeatedly) until it is viewed, it is ensured that the content is viewed.

(5) Advertisers and broadcasting business parties can control the degree of exposure of a content at a low cost compared with a case in which means requiring a higher cost, such as a re-broadcasting program or a video on demand (VOD), is used.

(6) Since the levels of viewing of contents stored in the hard-disk recorder 11 are fed back from the server system 4 to broadcasting business parties and advertisers, the correct audience rating is obtained and an advertisement effect is accurately checked. The preference information of the user included in feedback information can be analyzed to obtain information required to provide future service.

(7) Broadcasting business parties and advertisers, or a service provider who operates the server system 4 can charge an advertisement fee, a viewing fee, or a service fee according to a degree-of-exposure condition and a viewing condition fed back, as a consideration of an induced effect.

(8) Since broadcasting business parties and advertisers obtain the correct audience rating, an advertisement fee (service fee), a secondary-use fee, or a viewing fee is calculated, as a value obtained objectively.

(9) When contents are automatically reproduced, a content selection operation is unnecessary. When a content for which the degree of exposure is controlled by a broadcasting business party is selected, one of very many contents can be selected within a short period.

(10) When contents which the user prefers are exhibited at a higher priority according to the preference of the user, customer satisfaction is improved.

(11) Control is made such that the degrees of exposure of contents which have been viewed are lowered so that the contents are unlikely to be viewed. Therefore, the user does not need to perform troublesome content management (operations which were conventionally performed, such as moving a viewed content to another storage location, become unnecessary).

A case in which the degrees of exposure of broadcasting contents are controlled has been described. The present invention is not limited to this case. The degrees of exposure of data, electronic mail, web pages, or multimedia contents stored in a personal computer, for example, can be controlled.

The above-described series of processing can be executed not only by hardware but also by software. When the series of processing is executed by software, a program constituting the software is installed from a recording medium to a computer built in special hardware, or to an apparatus which can execute various functions by installing various programs, such as a general-purpose personal computer.

The recording medium can be a package medium which is distributed separately from a computer to provide the user with the program and in which the program is recorded, such as a magnetic disk (including a floppy disk), an optical disk (including compact disk read only memory (CD-ROM) and a digital versatile disk (DVD)), a magneto-optical disk (including a Mini disk (MD)), or a semiconductor memory. In addition, the recording medium can be a device in which the program is recorded and which is provided for the user in a condition in which it is built in a computer in advance, such as the ROM 83 or the hard-disk drive 85.

In the present specification, steps describing the program recorded in a recording medium include not only processing to be executed in a time-sequential manner in a described order but processing which is not necessarily executed time-sequentially but is executed in parallel or independently.

In the present specification, a system refers to the entire apparatus formed of a plurality of units.

What is claimed is:

1. A content-exhibition control apparatus for exhibiting content in another apparatus, comprising:

generating means for generating degree-of-exposure control data used to control the degree of exposure of the content;

scheduling means for scheduling the exhibition of the content;

exhibition control means for controlling the exhibition of the content recorded in the another apparatus, according to the degree-of-exposure control data generated by the generating means and the scheduling means;

obtaining means for obtaining the state data of the content sent from the another apparatus, wherein the state data includes information on viewed content and not viewed content, and wherein the generating means generates the degree-of-exposure control data according to the state data of the content, obtained by the obtaining means;

storing means for storing user information which includes user preferences with the state data of the content collected from a hard-disk recorder in a customer database; and feedback means for feeding back said degree of exposure of the content, wherein an audience rating and an advertisement effect are calculated as a function of the feedback data; and rescheduling means for rescheduling the exhibition of not viewed content, independently of the user's operation, wherein the not viewed content is rescheduled repeatedly until it is viewed, and wherein a number of times reproduction is to be performed is specified in a degree of exposure designation and the degree of exposure designation is updated when rescheduling is performed.

2. A content-exhibition control apparatus according to claim 1, wherein the degree-of-exposure control data includes a content ID, an exposure type, and an exposure value; and the state data of the content includes a viewing condition and a degree-of-exposure condition.

3. A content-exhibition control method for a content-exhibition control apparatus for exhibiting content in another apparatus, comprising:

a generating step of generating degree-of-exposure control data used to control the degree of exposure of the content;

a scheduling step for scheduling the exhibition of the content;

an exhibition control step of controlling the exhibition of the content recorded in the another apparatus, according to the degree-of-exposure control data generated in the generating step and the scheduling step;

an obtaining step of obtaining the state data of the content sent from the another apparatus, wherein the state data includes information on viewed content and not viewed content, and wherein the degree-of-exposure control data is generated in the generating step according to the state data of the content, obtained in the obtaining step;

a storing step for storing user information which includes user preferences with the state data of the content collected from a hard-disk recorder in a customer database; and a feedback step for feeding back said degree of exposure of the content, wherein an audience rating and an advertisement effect are calculated as a function of the feedback data; and a rescheduling step for rescheduling the exhibition of not viewed content, independently of the user's operation, wherein the not viewed content is rescheduled repeatedly until it is viewed, and wherein a number of times reproduction is to be performed is specified in a degree of exposure designation and the degree of exposure designation is updated when rescheduling is performed.

\* \* \* \* \*